US009973269B2

(12) United States Patent
Sarkar et al.

(10) Patent No.: US 9,973,269 B2
(45) Date of Patent: May 15, 2018

(54) ELECTRONIC DEVICES, SYSTEMS, AND METHODS FOR DATA EXCHANGE

(71) Applicant: San Diego State University Research Foundation, San Diego, CA (US)

(72) Inventors: Mahasweta Sarkar, San Diego, CA (US); Christopher Paolini, San Diego, CA (US); Santosh Nagaraj, San Diego, CA (US)

(73) Assignee: SAN DIEGO STATE UNIVERSITY RESEARCH FOUNDATION, San Diego, CA (US)

( * ) Notice: Subject to any disclaimer, the term of this patent is extended or adjusted under 35 U.S.C. 154(b) by 122 days.

(21) Appl. No.: 13/791,387

(22) Filed: Mar. 8, 2013

(65) Prior Publication Data

US 2013/0267171 A1 Oct. 10, 2013

Related U.S. Application Data

(60) Provisional application No. 61/609,230, filed on Mar. 9, 2012.

(51) Int. Cl.
*H04B 5/00* (2006.01)
*H04B 7/24* (2006.01)
*G06Q 10/00* (2012.01)

(52) U.S. Cl.
CPC ............ *H04B 7/24* (2013.01); *G06Q 10/00* (2013.01)

(58) Field of Classification Search
CPC ........ H04B 7/24; H04W 4/008; H04W 4/206; H04W 88/02

USPC ........................................................ 455/41.1
See application file for complete search history.

(56) References Cited

U.S. PATENT DOCUMENTS

| 7,249,182 B1 | 7/2007 | Heinonen et al. |
| 8,006,121 B1* | 8/2011 | Samoilova .......... G06F 11/2294 714/2 |
| 2005/0086120 A1* | 4/2005 | Shao-Chi ........... G06Q 30/0601 705/26.1 |

(Continued)

OTHER PUBLICATIONS

Written Opinion of the International Searching Authority for International Application No. PCT/US2012/031330, dated Jun. 27, 2012.

*Primary Examiner* — Ajibola Akinyemi
(74) *Attorney, Agent, or Firm* — Noon Intellectual Property Law, P.C.

(57) ABSTRACT

A wearable electronic device for proximity-based social and professional networking which features electronics and software for the passive automated local wireless exchange of personal and/or business information with other electronic devices is disclosed. In some embodiments, an electronic device includes a controller having an operations unit; a communication unit configured to receive and/or transmit data from a first external source; and a memory unit configured to communicate with the controller and receive and/or transmit data from the controller. The operations unit may be configured to determine if received data from the first external source meets a set threshold and wherein the operations unit may be configured to instruct communication unit to accept data that meets or exceeds said threshold. The communication unit may receive and transmit data from the first external source provided the external source is within a predetermined proximity.

16 Claims, 10 Drawing Sheets

(56) References Cited

U.S. PATENT DOCUMENTS

| | | | |
|---|---|---|---|
| 2005/0282530 A1* | 12/2005 | Raff | H04L 29/06 |
| | | | 455/418 |
| 2007/0265025 A1* | 11/2007 | Commarford | H04W 28/14 |
| | | | 455/517 |
| 2008/0096484 A1* | 4/2008 | Tuttle | H04B 5/0068 |
| | | | 455/41.2 |
| 2008/0208971 A1* | 8/2008 | Costin | H04W 4/02 |
| | | | 709/204 |
| 2012/0258660 A1* | 10/2012 | Rajendran | H01Q 7/00 |
| | | | 455/41.1 |
| 2013/0086670 A1* | 4/2013 | Vangpat | H04L 9/3213 |
| | | | 726/8 |
| 2013/0280033 A1* | 10/2013 | Babbitt | A01K 11/006 |
| | | | 415/1 |

* cited by examiner

ELECTRONIC DEVICES, SYSTEMS, AND METHODS FOR DATA EXCHANGE

CROSS-REFERENCE TO RELATED APPLICATIONS

The present application claims the benefit of U.S. provisional patent application No. 61/609,230, filed Mar. 9, 2012, and is related to international patent application no. PCT/US 12/31330, filed Mar. 30, 2012, which are both incorporated herein by reference in their entirety.

FIELD

The disclosure relates generally to mobile electronic devices for data exchange, and more specifically to mobile electronic devices for social networking. For example, in one embodiment, a smart badge worn by a user which features electronics and software for the passive automated local wireless exchange of personal and/or business information with other smart badges is disclosed.

BACKGROUND

Ubiquitous computing and communication has been the dream of network researchers for the past few decades. Mobile telephones, Facebook®, Twitter®, and other social and business networking avenues have provided personal connection and interactivity on a scale that has never been seen before. However, improvements to these processes are desired in order to unlock the maximum utility these types of services offered to users.

In mobile devices, data is often transmitted and received via 3G/4G, Bluetooth and/or Wi-Fi communications. However, there may be scenarios where cellular (e.g., 3G/4G) or Wi-Fi services are either unattractive or even impossible to use. For example, during emergency situations (e.g., hurricanes, earthquakes and other natural disasters) cellular networks may become overwhelmed and power outages may occur, and people may find it very difficult to obtain cellular or Wi-Fi services. Another example is a scenario where one may want to exchange small amounts of data with others repeatedly and over a relatively short range, such as in the same room or building. Using either cellular or Wi-Fi services in that case might significantly reduce battery life or even incur expenses for downloading data.

BRIEF SUMMARY

Accordingly, there is provided herein devices, systems and methods that promote and improve such ubiquitous computing and communication. In one embodiment, a wearable electronic device that may be configured to exchange information is provided.

In some embodiments, an electronic device for data exchange includes a controller having an operations unit; a communication unit configured to receive and/or transmit data from a first external source using a frequency modulated (FM) radio. The operations unit may be configured to determine if received data from the first external source meets a set threshold and wherein the operations unit may be configured to instruct communication unit to accept data that meets or exceeds said threshold. The communication unit may receive and transmit data from the first external source provided the external source is within a predetermined proximity.

In other embodiments, a system for collecting personal data includes: a portable electronic device configured to receive third-party user profile data from external sources operating within close proximity of the electronic device, using an FM radio, and exceeding a compatibility threshold on the electronic device; and a computing device in communication with the portable electronic device. The computing device may be configured to receive instructions from a user and implement the instructions on the portable electronic device.

In still other embodiments, a method for identifying individuals having one or more pre-designated traits includes: storing a user profile data on a portable electronic device; transmitting the user profile data from the portable electronic device using an FM radio; receiving a third-party user profile data at the portable electronic device using the FM radio; comparing the user profile data with the third-party user profile data; determining if the third-party user profile data meets or exceeds a predetermined threshold defined in part by the user profile; and identifying the third-party user profile data as having one or more pre-designated traits if the third-party user profile data meets or exceeds the predetermined threshold.

In other embodiments, a non-transitory computer-readable medium having instructions stored thereon for execution by a processor to provide a method for identifying individuals having one or more pre-designated traits includes: storing a user profile data on a portable electronic device; transmitting the user profile data from the portable electronic device using an FM radio; receiving a third-party user profile data at the portable electronic device using the FM radio; comparing the user profile data with the third-party user profile data; determining if the third-party user profile data meets or exceeds a predetermined threshold defined in part by the user profile; and identifying the third-party user profile data as having one or more pre-designated traits if the third-party user profile data meets or exceeds the predetermined threshold.

In still other embodiments, an electronic device for data exchange includes: means for storing a user profile data; means for transmitting the user profile data using an FM radio; means for receiving a third-party user profile data using the FM radio; means for comparing the user profile data with the third-party user profile data; means for determining if the third-party user profile data meets or exceeds a predetermined threshold defined in part by the user profile; and means for identifying the third-party user profile data as having one or more pre-designated traits if the third-party user profile data meets or exceeds the predetermined threshold.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

In the present disclosure, there is provided a methodology for exchanging simple messages among small, low-cost, low-power personal wireless devices which we refer hereinafter to as "smart badges". These smart badges may allow users to build their social/professional network with people who share similar social/professional ideologies by simply wearing the badges and having the badges identify others with whom the user has a common interest. The smart badge can identify others with a common interest by collecting, aggregating, and disseminating data about others wearing smart badges located in a proximity to the original user. Thus, in some instances, the smart badge may assist single people in establishing relationships, researchers in identifying potential collaborators, and business people in identifying clients or investors.

Figure 1:
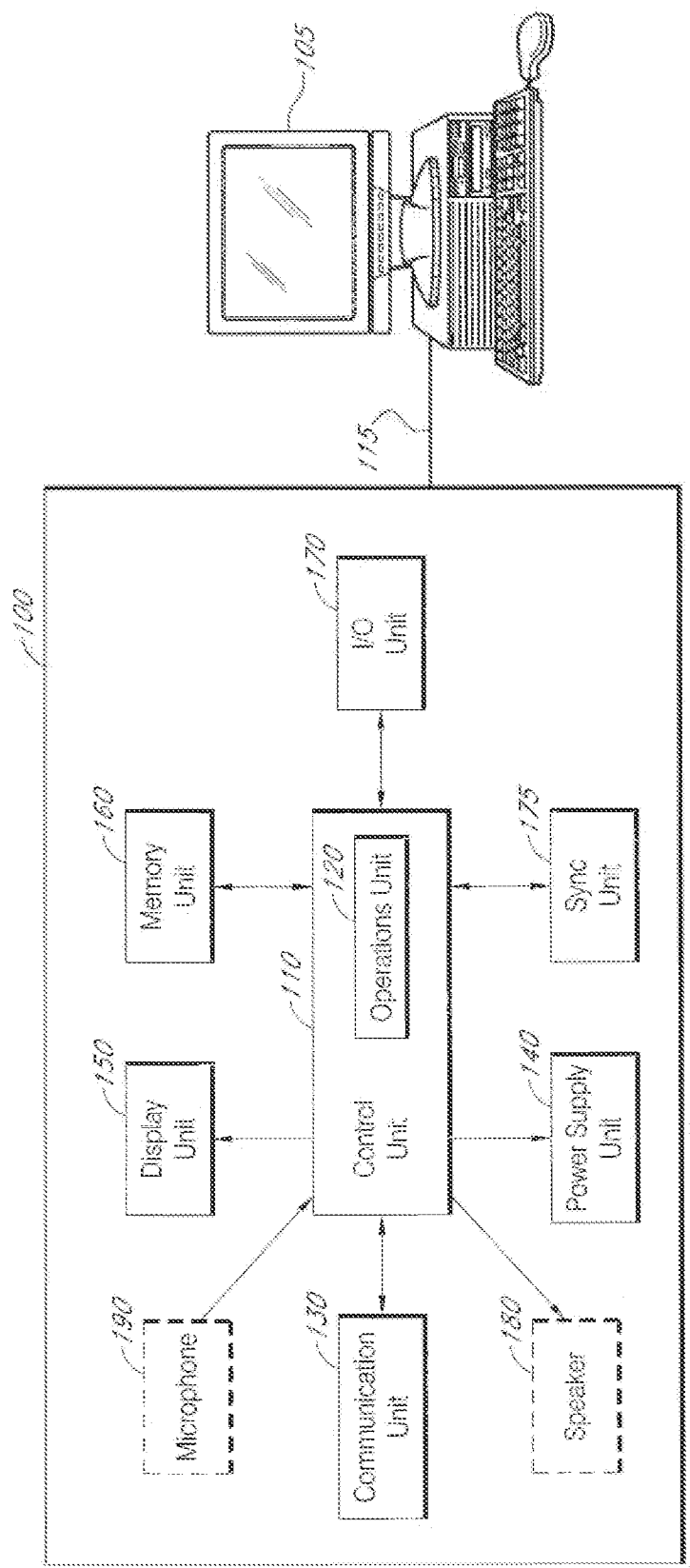
FIG. 1 a functional block diagram illustrating an example structure of a smart badge in accordance with an embodiment of the disclosure.

Referring initially to FIG. 1, a functional block diagram illustrating an example structure of a smart badge 100 is shown. Smart badge 100 may include a control unit 110, a communication unit 130, a power supply unit 140, a display unit 150, a memory unit 160, an input/output ("I/O") unit 170, and a synchronization or "sync" unit 175. In some embodiments, smart badge 100 may also optionally include a speaker 180 and/or a microphone 190. Control unit 110 may include an operations unit 120.

The control unit 110 may be a programmable processor configured to control the operation of the smart badge 100 and its components. For example, control unit 110 may be a microcontroller ("MCU"), a general purpose hardware processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration. Such operations, for example, may be stored and/or executed by operations unit 120.

Figure 2:
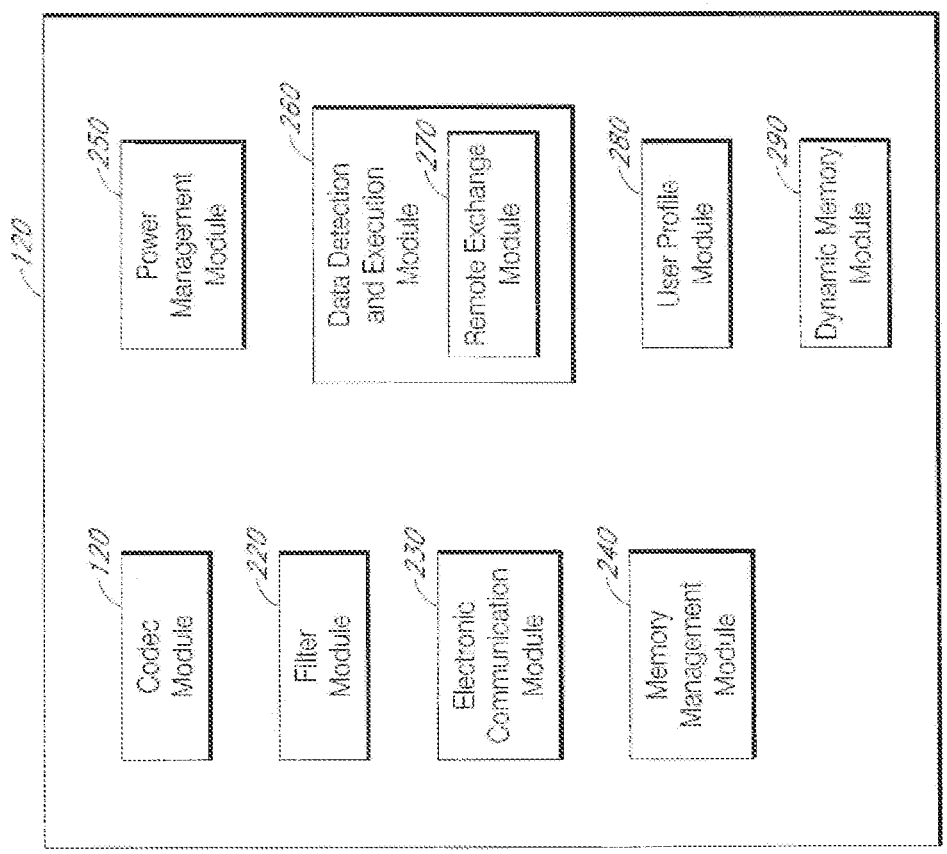
FIG. 2 is a functional block diagram illustrating an example structure of an operations unit in accordance with an embodiment of the disclosure.

Referring briefly to FIG. 2, a functional block diagram illustrating an example structure of operations unit 120 is shown. Operations unit 120 may include a CODEC module 210, a filter module 220, an electronic communication module 230, a memory management module 240, a power management module 250, a data detection and exchange module 260, a data or user profile module 280, and a dynamic memory module 290. While shown as part of operations unit 120, dynamic memory module 290, may be located separately on control unit 110. In some embodiments, data detection and exchange module 260 further includes a remote exchange module 270.

As an example, CODEC module 210 may include programming instructions for one or more CODECs. Filter module 220 may include programming instructions for one or more electronic filters. Electronic communication module 230 may include programming instructions for handling electronic communication protocols such as Bluetooth, Wi-Fi, and others as known by those skilled in the art, and implemented by communication unit 130. Memory management module 240 may include programming instructions for memory management of, for example, memory unit 160. Power management module 250 may include programming instructions for power management of, for example, power supply unit 140. Data detection and exchange module 260 may include programming instructions for detections and data exchange with one or more third-party smart badges. Remote exchange module 270 may include programming instructions for transmission and reception of data from the smart badge to a remote server, such as a cloud computing infrastructure. Data profile module 280 may include programming instructions for one or more user-data profile matching algorithms. Dynamic memory module 290 may include programming instructions for storing one or more data sets, such as a user profile, a plurality of profiles from one or more third-party smart badges, time and location data.

In an embodiment, control unit 110 loads instructions (e.g., in the form of a computer program) from the operations unit 120 and executes these instructions to control the system. In its execution, the control unit 110 provides the data profile module 280 as a software system. Alternatively, this service can be implemented as separate hardware components in the control unit 110 or the smart badge 100.

Communication unit 130 may be configured to transmit and/or receive data to and from smart badge 100. In one embodiment, communications unit 130 includes one or more antenna(e). For example, a single wideband antenna may provide for badge-badge communication. In addition, the single wideband antenna may provide for communication to/from a smart badge and various networks the badge may use to send/receive data, such a Bluetooth, Wi-Fi (including, but not limited to 802.11), Frequency Modulation ("FM"), Global Positioning System ("GPS"), Infrared ("IR"), Radio-frequency Identification ("RFID"), Near-field Communication ("NFC"), etc. While a single wideband antenna may be used, in some embodiments, multiple antennas can be used.

In some embodiments, short-range or short-range FM communications are communications that are configured to be received within 100 ft. or less from a transmitter (e.g., badge to badge communications via low-power FM). In contrast, in some embodiments, long-range communications are communications that are received at a server from a transmitter (e.g., badge to server via Wi-Fi). In some embodiments, communication unit 130 includes a micro or miniature GPS receiver, an FM radio used for inter-badge communication, an 802.11 radio used for synchronizing collected third-party profile data with an internet accessible cloud infrastructure over public Wi-Fi networks, and a Bluetooth transceiver used for badge to mobile phone communication when public Wi-Fi is unavailable. In this last example, a user's mobile phone may act as an internet gateway device, allowing the smart badge to upload stored third-party profile data through a mobile phone over a Bluetooth connection and from the mobile phone to the internet over, e.g., a Global System for Mobile Communications ("GSM") or Code Division Multiple Access ("CDMA") CDMA cellular network.

In some embodiments, the smart badge may be continuously broadcasting the wearer's user profile data. In such embodiments, it may be necessary to have a designated radio or transmitter for this purpose. It should be appreciated that, under such circumstances, the smart badge as a stand-alone device is much more preferred than attempting to transmit and collect user data using, for example a smart phone or cell phone, because a radio would be tied up and the battery would quickly run down. However, it is contemplated that a smart phone, cellular phone, tablet (e.g., Ipad®), etc. may perform the functions of the smart badge if a dedicated radio and the necessary modules were integrated into these devices.

Power supply unit 140 may be configured to provide power to the smart badge 100. For example, power supply unit 140 may include a rechargeable battery, e.g. a lithium-polymer battery. In some embodiments, power supply unit 140 provides power to smart badge 100 without requiring a recharge for several days of use (e.g., two, three, four, five, or more days).

Display unit 150 may be configured to display information to a user or wearer of the smart badge. For example, in some embodiments, display unit 150 includes a liquid crystal display ("LCD") and presents information to the user in the form or text and/or images. The LCD may, in some embodiments, be a touch screen. Alternatively, display unit 150 may be used itself for displaying messages and interactions with other smart badges. For example, in some embodiments, display unit 150 may be configured to provide a third-party's profile picture, such as when a person having a similar interest to the smart badge wearer is nearby. This would allow the smart badge wearer to easily identify someone who the smart badge exchanged information with and has a similar interest with, allowing the smart badge wearer to more easily initiate a conversation.

Memory unit 160 may be configured to store data temporarily or for long term use by other components of the smart badge 100, such as for storing data used by the data profile module 280. Such stored data may include user-profile data such as the person's social, professional and extracurricular interests along with her desire to collaborate with individuals with specific profiles on the social, professional or extracurricular front (e.g., a wireless networker interested in collaborating with a researcher in video compression technologies). In one implementation, memory unit 160 is implemented as Random Access Memory ("RAM"). In one implementation, memory 160 also includes long-term or permanent memory, such as flash memory and/or Read-Only Memory ("ROM").

I/O unit 170 may include one or more I/O ports (not shown) and be configured to connect to corresponding I/O devices, such as external storage or supplemental devices (e.g., a printer, a Personal Digital Assistant ("PDA"), a desktop computer). In one implementation, the ports of the I/O unit 170 include ports such as: Universal Serial Bus ("USB") ports (e.g., micro, mini), Personal Computer Memory Card International Association ("PCMCIA") ports, serial ports, and/or parallel ports. In another implementation, the I/O unit 170 includes a wireless interface for communication with external devices wirelessly. This wireless interface may be in addition to or in place of communication unit 130. In some embodiments, I/O unit 170 provides a means for charging smart badge 100. For example, in such embodiment, I/O unit 170 may allow smart badge 100 to connect to a desktop computer 105 via a connection 115 to charge power supply unit 140.

Synchronization unit 175 may include a physical means such as a button (not shown) that a user may activate or push to have any data stored on smart badge 100 uploaded to a remote server for data synchronization. In one embodiment, data from smart badge 100 is synchronized via one-way file synchronization or mirroring, such that collected data stored on smart badge 100 about third-party badge wearers (e.g., exchanged user-profile information) is copied from smart badge 100 to one or more target locations, e.g., a cloud computing structure or remote server, but no data is copied back to smart badge 100. In another embodiment, data from smart badge 100 is synchronized via two-way file synchronization, so that updated data is copied in both directions (e.g., smart badge to/from server), with the purpose of keeping data stored in the two or more locations identical to each other. In general, and for the purposes of keeping the cost of smart badge 100 to a minimum (e.g., by requiring less memory), the default synchronization is one-way file synchronization.

Speaker 180 and microphone 190 are optional components and are configured to accept input from the user and present information to the user. For example, as will be described in further detail below, when data is sent to smart badge 100, the speaker 180 may make a "ping" to alert the smart badge user that a person with similar interests is close by. Additionally, in some embodiments, the user of the smart badge may want to update what interests he/she hopes to make a match with. In such embodiments, the user may speak into microphone 190 to have the data profile updated. Additionally, while not specifically shown, badge 100 may further include a vibrator, such that when a when data is sent to smart badge 100, the vibrator may vibrate to alert the smart badge user that a person with similar interests is close by.

While not specifically shown, the smart badge 100 may include additional hardware and software typical of computer systems (e.g., power, cooling, operating system) is desired. In other implementations, different configurations of the smart badge 100 can be used (e.g., different bus or storage configurations or a multi-processor configuration). Some implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

It should be appreciated that smart badges are designed to be devices that are comfortable to wear and not physically bulky. Because the smart badge 100 integrates several different wireless network technologies into a small form factor wearable device, it is contemplated that the casing or housing of smart badge 100 is a light-weight, yet capable of providing structural protection for its internal elements. For example, it may be desirable to fabricate the housing from a light weight, waterproof, plastic case. Such housings are known by those of skill in the art, and may optionally include reinforcing means, such as composites. In some embodiments, the smart badge has a largest dimension of no more than about 10 cm, or a largest dimension of no more than about 5 cm. In some embodiments, the smart badge weighs no more than about 150 g, or no more than about 100 g.

As outlined above, smart badges provide a means for two persons coming into physical proximity, for instance, shaking hands or simply passing close to one another at a conference, a social party, or even a super-market, to exchange some information corresponding to the contents of a generalized business card. Because a random profile exchange and storage might not be of interest to either party concerned (nor a fruitful exercise in conserving battery and memory space in the badge), the smart badges may be configured to first detect a potential overlap in "interest" of the two parties (e.g., using a key-indexed quick profile-matching algorithm), followed by a detailed data exchange, only if there is a "match". The "interest" could be varied depending on user choice. For example, users could choose to have a social profile or a business profile or even both profiles stored in their smart badges which would serve as the basis of the user's "interest".

Figure 3:
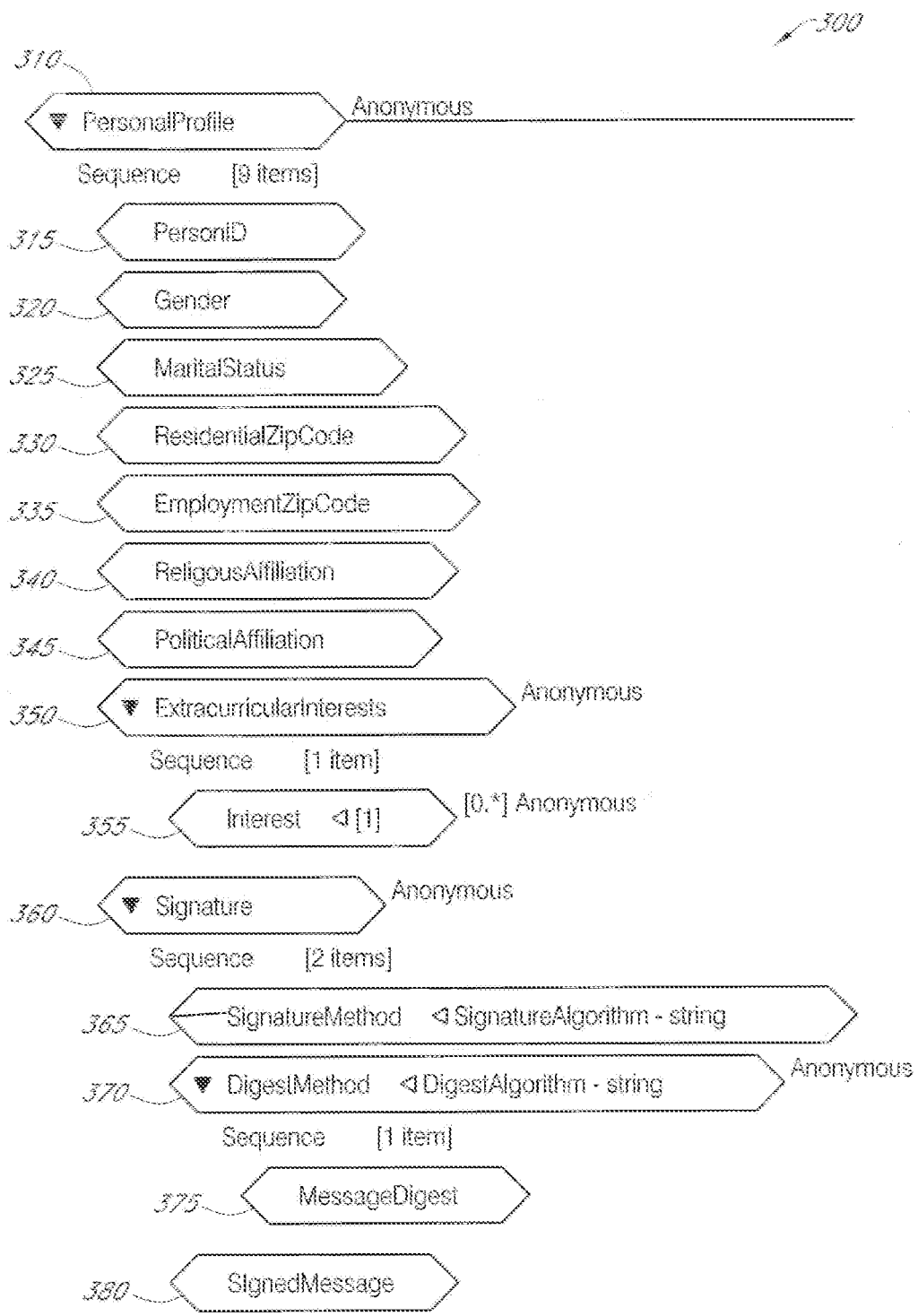
FIG. 3 is an example personal profile tree in accordance with an embodiment of the disclosure.

Such a user-profile is shown in the example personal profile tree 300 of FIG. 3. For example, in the personal profile 310 of FIG. 3, a series of drop-down menus are provided for the user to input his data. Such information may include the PersonID 315, Gender 320, MaritalStatus 325, ResidentialZipCode 330, EmploymentZipCode 335, ReligiousAffiliation 340, PolicalAffiliation 345, ExtraCurricular Interests 350, Interest 355, Signature 360, SignatureMethod 365, DigestMethod 370, MessageDigest 375, and SignedMessage 380. Any number of menu items could be listed.

Alternatively, in some embodiments, the user may enter his profile information by entering in his information manually, for example, as a data string. In such instances, date profile module 280 may be configured to parse the data string and save as and compare using Boolean searching, for example. In still other embodiments, a user may use a combination of pull-down menus and data entry boxes to more accurately describe his user profile.

Figure 4:
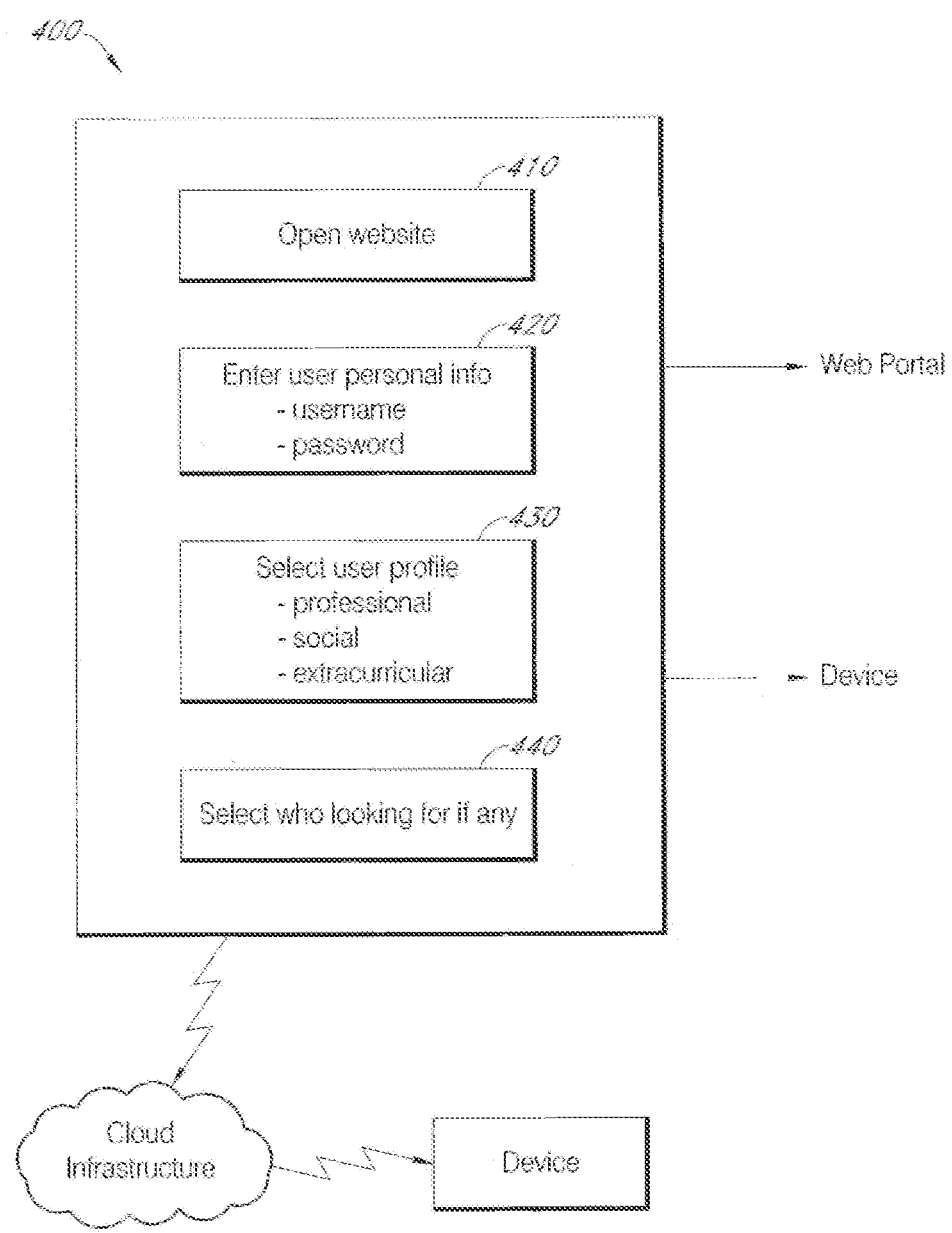
FIG. 4 is a flow diagram illustrating an example user profile entry process in accordance with an embodiment of the disclosure.

Referring now to FIG. 4, a flow diagram describing an example user profile entry process 400 is shown. User entry profile process 400 generally describes how a user may enter his profile information and set the profile information about others. In a first step, a user opens a smart badge website or equivalent application in box 410. Thereafter, the user logs into an account, e.g., by entering a username and/or password, in box 420. The user is then prompted to select one or more profiles, e.g., professional, social, extracurricular, etc., in box 430. The user may enter the profile information as described above in the discussion of FIG. 3. Next, in box 440, the user may select who or what kind of person they are looking to obtain information about. For example, the user may desire to find others that have an interest in yoga. In such an example, the user can use a dropdown menu to select that they are looking for "extracurricular profile type" with the activity of interest being yoga.

It should be appreciated that steps 410-440 may be performed on any computing device, such as a desktop computer, PDA, smartphone, etc., that allows a user to input and manipulate his data. In some embodiments, once the user profile data has been entered into the user account, the user profile data is uploaded to a web portal or to a cloud computing infrastructure. Thereafter, the user profile data is transmitted to the smart badge 100 via Wi-Fi, Bluetooth, etc. In alternate embodiments, the user profile data may be transmitted to smart badge 100 by directly connecting smart badge 100 to the computing device, e.g., through the use of a micro-USB cable plugged into I/O unit 170.

In some specific embodiments, profile data exchanged by smart badges that come into contact with one another may be encapsulated in XML Schema compliant documents. These profile documents may be transmitted within an XML envelope consisting of a header and body element, similar to Simple Object Access Process ("SOAP") request and response message. Such profile envelope is preferably capable of transporting multiple types of profiles. Separate XML Schemas may be developed to define such documents as a personal profile for exchanging general data about a person, a professional profile for exchanging career, business, and employment related information, an activity profile for exchanging information regarding athletic, hobby, and extracurricular interests, and a social profile for exchanging relationship status.

In some embodiments, each XML envelope document may be validated against its respective schema prior to each transmission and after each reception during an encounter. In such embodiments, when a smart badge receives a profile containing a validated XML envelope, the badge may process the XML document according to a user defined configuration that specifies how to handle XML document content. For example, a user may configure his or her personal profile to trigger an automatic Facebook™ News Feed or Wall update, to automatically create a new connection in LinkedIn® to indicate a new trusted business relationship, or trigger a Friendster$^{SM}$ mobile text alert.

In some embodiments, the automatic updating of user state information on popular social networking sites is accomplished using a social networking portal. This portal may include a cloud computing infrastructure and a relay service that interfaces with several popular social networking websites using open source application programming interfaces ("APIs") and social networking connectors. For example, Facebook™ provides an open API that allows one to develop custom applications that query and retrieve user content in XML or JSON format. Twitter provides a suite of open-source libraries that allow one to send and receive Twitter data. Most popular social networking sites provide an API to allow other websites to query and update user state information.

The relay service may be responsible for accepting smart badge encounter notifications through one of the modes of data transport shown in FIG. 8 and described in more detail below, translating XML content into a form suitable for an external social networking service, and forwarding the data to the service.

Figure 5:
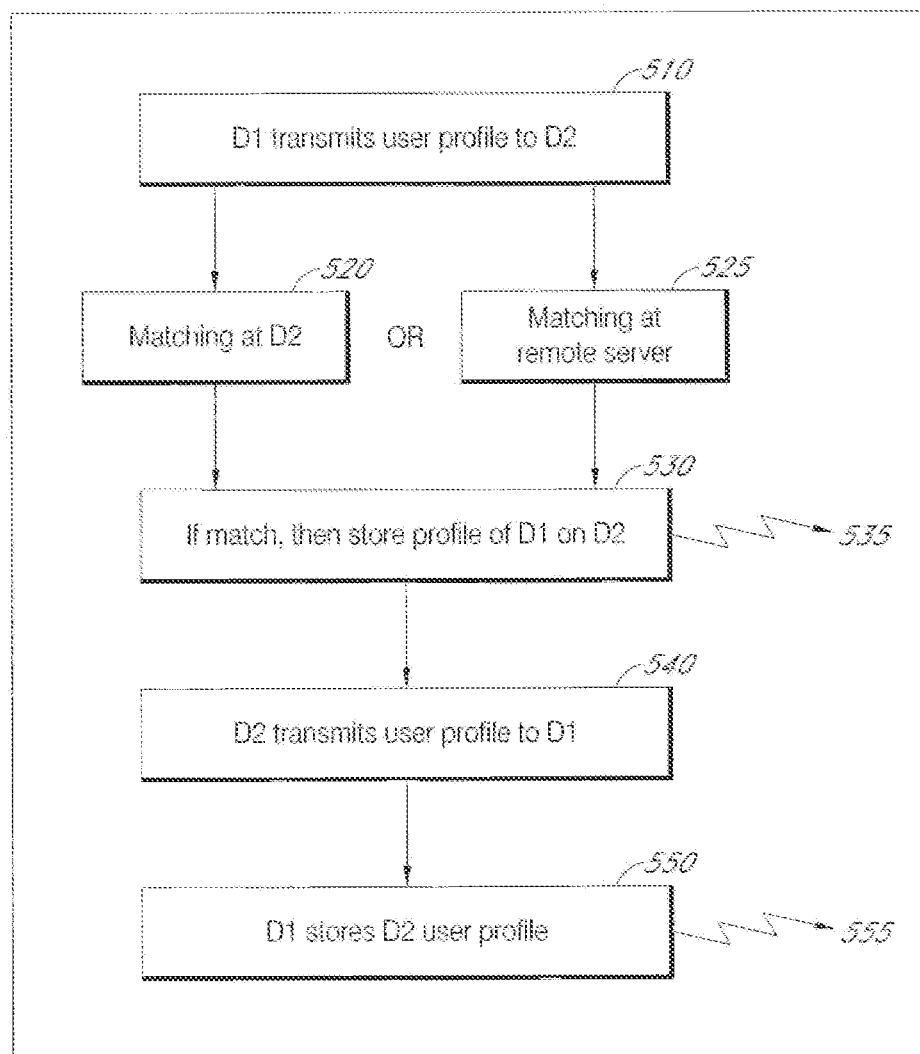
FIG. 5 is a flow diagram illustrating an example data flow process in accordance with an embodiment of the disclosure.

Referring now to FIG. 5, a flow diagram describing an example data flow process 500 between two smart badges is shown. Data flow process 500 generally describes how a user may transmit his user-profile data to a third-party smart badge wearer and receive user-profile data from the third-party smart badge wearer.

In a first step, a first smart badge device ("D1") sends its user profile data to a second smart badge device ("D2"), in box 510. D2 thereafter performs a matching of D1's user profile data using, e.g., a key-indexed quick profile-matching algorithm or statistical algorithm, in box 520. If there is a positive match, D2 stores D1's user profile data on D2, in box 530. In box 540, D2 transmits D2's user profile data to D1. D1 thereafter stores D2's user profile data on D1, in box 550.

Still referring to FIG. 5, in some embodiments, rather than having the user-matching profile performed by either device D1 or D2, the user profile comparison may be performed in a cloud infrastructure, e.g., a remote server, as shown by box 525. Use of the cloud infrastructure for comparing the user profiles may be desirable for a variety of reasons, and may be achieved using one or more semantic matching algorithms. For example, if a user (e.g., an undergraduate student majoring in Economics) configures her profile as somebody seeking a tutor in Economics and happens to come into proximity with another person who has configured her profile as an Economist who coaches undergraduate students, the semantic matching will be able to "understand" that rendering coaching in Economics is akin to being a tutor in Economics and hence will notify both users of each other's presence, thereby triggering an opportunity for potential collaboration. In some embodiments, performing the user profile matching remotely, while in real time, allows for the users to get a more meaningful or accurate match before they are out of range of each other.

As shown in FIG. 5, arrows 535 and 555 represent the transmission of exchanged stored data on devices D1 and D2, being uploaded to a remote server, e.g., within a cloud infrastructure. In some embodiments, the user profile data may be uploaded to the cloud via Wi-Fi or to a cellular phone via Bluetooth and from the cellular phone to the cloud via GSM or CDMA.

It should be appreciated that uploading the data to a remote server may serve to preserve the memory of the devices D1, D2. Such uploading may occur, for example: (1) after each interaction; (2) at regular or defined intervals; or (3) whenever there is free Wi-Fi available.

Figure 6:
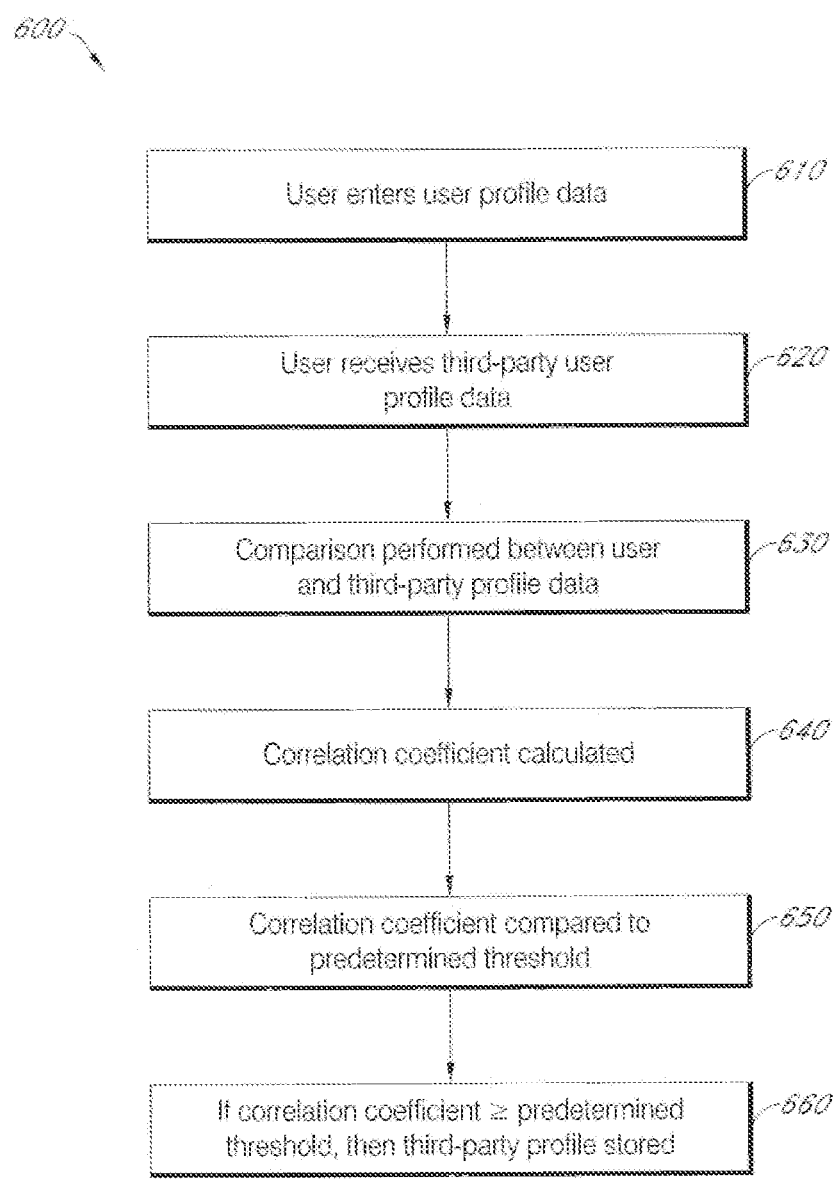
FIG. 6 is a flow diagram illustrating an example profile matching process between two user profiles in accordance with an embodiment of the disclosure.

Referring now to FIG. 6, a flow diagram describing an example profile matching process 600 between two user profiles is shown. Profile matching process 600 generally describes the overall process that a user employs from entering his user profile data to comparing and storing user profile data from a compatible third party smart badge wearer.

For example, in a first step, the user enters his user profile data in box 610. As will be appreciated, examples for box 610 have been described in further detail in the discussion of FIGS. 3 and 4.

Thereafter, the user receives the user profile data of the third-party in box 620. As will be appreciated, examples of box 620 have been described in further detail in the discussion of FIG. 5. In some embodiments, the user-profile received from the third-party can include (or consist only of) a unique identifier, which can then be used to access additional user-profile data via a server or cloud-computing infrastructure.

Upon receiving the user profile data of the third-party user, a comparison may be performed between the user's user profile and the third-party's user profile, in box 630. In some embodiments, the comparison may be performed using a key-indexed quick profile-matching algorithm. In other embodiments, the comparison is performed by comparing the number of interests common to both profiles and the total number of interests listed. For example, one common interest out of three total interests listed would lead to a higher correlation coefficient than one common interest out of five total interests listed.

Next, in box 640, a correlation coefficient may be calculated. Suitable correlation coefficients include, for example the Pearson (covariance) coefficient and the Spearman (rank) coefficient. In general, the correlation coefficient may be used to determine how close of a match the profiles are between the user and the third-party. Alternatively, the correlation coefficient may be used to describe how close of a match the third-party's user profile is to the type of person the user is seeking out (see for example, box 440 of FIG. 4). This correlation coefficient may generally correspond to a numerical value between 0 and 1 and can be dependent upon the extent of the information in the user profile compared to the information in a third-party user profile.

In some embodiments, there may be additional breakdown of comparison, e.g., a sliding scale. For example, there may be preset values of "high", "medium", "low" and/or "no match". As an example, if there are three possible items or interests that a user is searching for and: (1) a third-party user has a match of 3/3, then he may be considered a "high" match; (2) a third-party user has a match of 2/3, then he may be considered a "medium" match; (3) a third-party user has a match of 1/3, then he may be considered a "low" match; or (4) a third-party user has a match of 0/3, then he may be considered "no match". It should be appreciated that the use of three possible items or interests is arbitrary, and that any number may be used. Additionally, the sliding scale may also be altered, as desired.

Once the correlation coefficient is calculated, it may be compared against a predetermined threshold, as shown in box 650. The predetermined threshold may be set by the user, for example, when the user is selecting what type of person or what types of interests they are seeking to collect profiles on. Alternatively, there may be a predetermined threshold set on the smart badge website or on the smart badge itself, e.g., a sort of default factory setting.

In some embodiments, the sliding scale settings may be used as the predetermined threshold. If for example, the predetermined threshold is set at "low" match, then anything at or above "low" match may be saved. In another example, if the predetermined threshold is set at "no match", then all third-party user profiles will be saved regardless of match.

If the correlation coefficient is greater or equal to the predetermined threshold, the third-party's user profile may be stored in box 660. In some embodiments, the stored third-party user profiles may be tiered, such as using the sliding scale binning.

It should be appreciated that steps 630-660 may be performed on the smart badge and/or on any computing device, such as a desktop computer, PDA, smartphone, etc. Alternatively, steps 630-660 may be performed using the cloud infrastructure. If steps 630-660 are performed on the smart badge, then the controller, e.g., a processor, will typically be employed for matching with the advantage being that access to the internet is not necessary and hence can be done almost everywhere. If steps 630-660 are performed on a server in the cloud infrastructure, then the server will typically be employed for matching user queries with other users' profiles (e.g., via semantic matching). This matching is generally not performed on the badge itself since the complexity is high, thereby requiring greater resources.

Figure 7A:
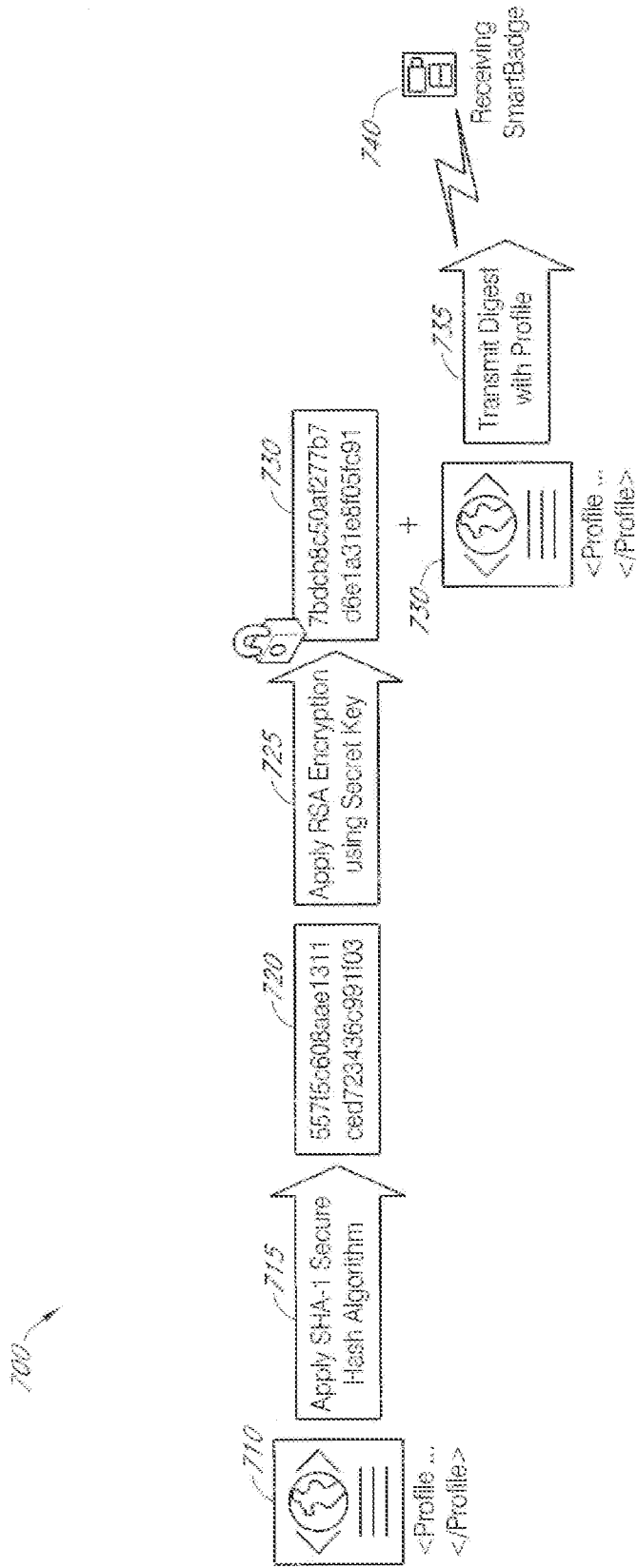
FIGS. 7A and 7B are functional block diagrams illustrating the transmission of an authenticated third-party user profile during a smart badge encounter (FIG. 7A) and authentication of a received third-party user profile (FIG. 7B) in accordance with an embodiment of the disclosure.
Figure 7B:
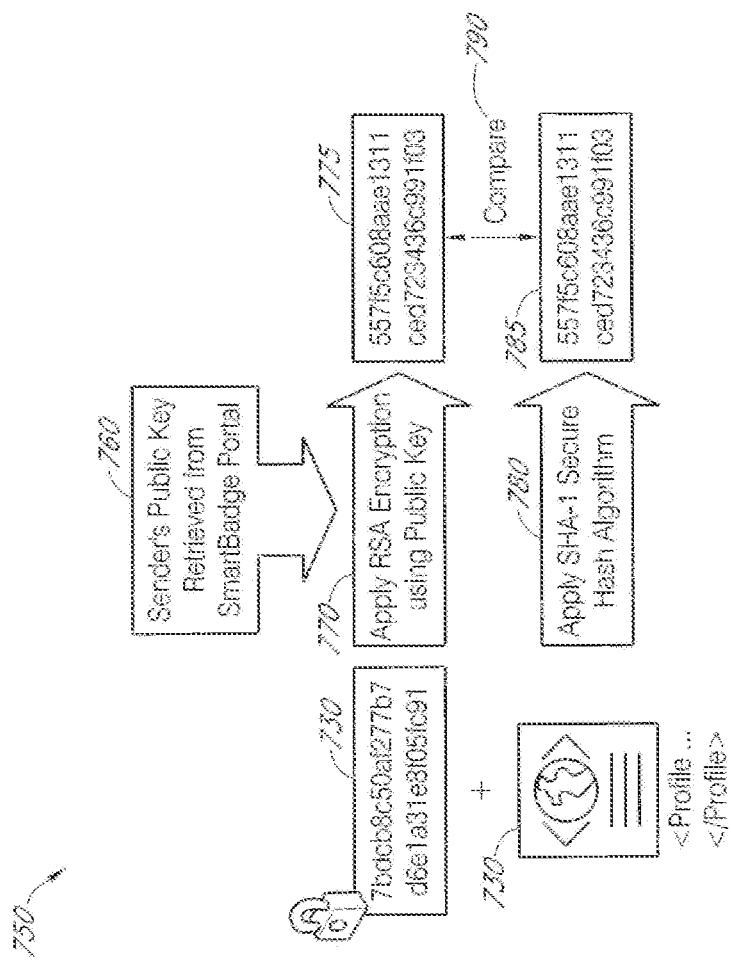

Referring now to FIGS. 7A and 7B, a functional block diagram illustrating the transmission of an authenticated third-party user profile during a smart badge encounter (FIG. 7A) and authentication of a received third-party user profile (FIG. 7B) are shown.

A concern that comes to mind when one considers a device such as the smart badge is the potential for fraud, whereby a dishonest user intentionally configures a smart badge with fraudulent profile attributes and electronically advertises himself as someone other than he truly is. To protect against intentional electronic misrepresentation, in some embodiments, an XML Signature standard may be used to transport a digital signature along with each profile exchange. As shown in FIG. 7A, for example, a cryptographic hash function, such as SHA-1, may be applied to each Profile element prior to transmission (box 710), as shown by arrow 715. This may yield a hash value or message digest that corresponds to a fixed size bit string, as shown by box 720. The message digest may then be encrypted using an asymmetric key algorithm such as RSA, as shown by arrow 725. A new XML document may then be constructed that contains the original Profile element in the clear along with the encrypted message digest (shown collectively as box 730). The digest may be encrypted using a secret key stored in the smart badge's RAM, e.g., non-volatile RAM ("NVRAM").

This secret key may be generated the first time a user registers a new smart badge through an internet accessible portal that maintains the accounts of smart badge card holders, e.g., such as the portal hosting process 400 in FIG. 4. The secret key may be kept private, e.g. is never shared with any user, including the badge's owner, and may not be accessed, transmitted, or altered unless the badge is reregistered with the portal. The secret key itself may be generated, along with a public key, using an RSA key generation algorithm that may be encoded in firmware and stored within the badge. When a card is registered (or re-registered), the public key that gets generated may be uploaded to the portal and stored in a publically accessible database along with the user's smart badge ID. When an encounter takes place, the XML document that is transmitted from one card to another (badge 740) may contain the sender's Profile element and the message digest that was encrypted with the secret key stored in the sender's smart badge, as shown by arrow 735.

Now turning to FIG. 7B, to authenticate the transmitted Profile (shown collectively as box 730), the receiving smart badge may access the internet portal and retrieve the sender's public key using the sender's Smart badge ID as a query key, as shown by arrow 760. The receiving badge may then attempt to decrypt the message digest using the retrieved public key, as shown by arrow 770. The receiving badge may then generate a message digest of the Profile element (box 775) and perform a bitwise comparison of the decrypted message digest with the newly generated one, as shown by arrow 790). The newly generated message digest may be achieved in box 785, by applying the secure hash algorithm, as shown by arrow 780, to the original Profile element (this may be duplicative of the process shown in 710, 715, and 720 of FIG. 7A).

In general, a characteristic of asymmetric key algorithms is that messages encrypted with a public key can only be decrypted using the corresponding private key and vice versa. Thus, if the sender is truly who he claims to be, only the public key of the true sender will be able to yield a decrypted message digest that exactly matches the hash of the transmitted Profile element. In order to improve performance, in some embodiments, a card holder may configure a smart badge to unconditionally accept and store all received profiles and postpone profile authentication until synchronization. This may be useful when a user wishes to accept profiles in areas where wireless Internet service is not available and the user does not want to use his or her mobile phone to authenticate each profile in real-time.

Figure 8:
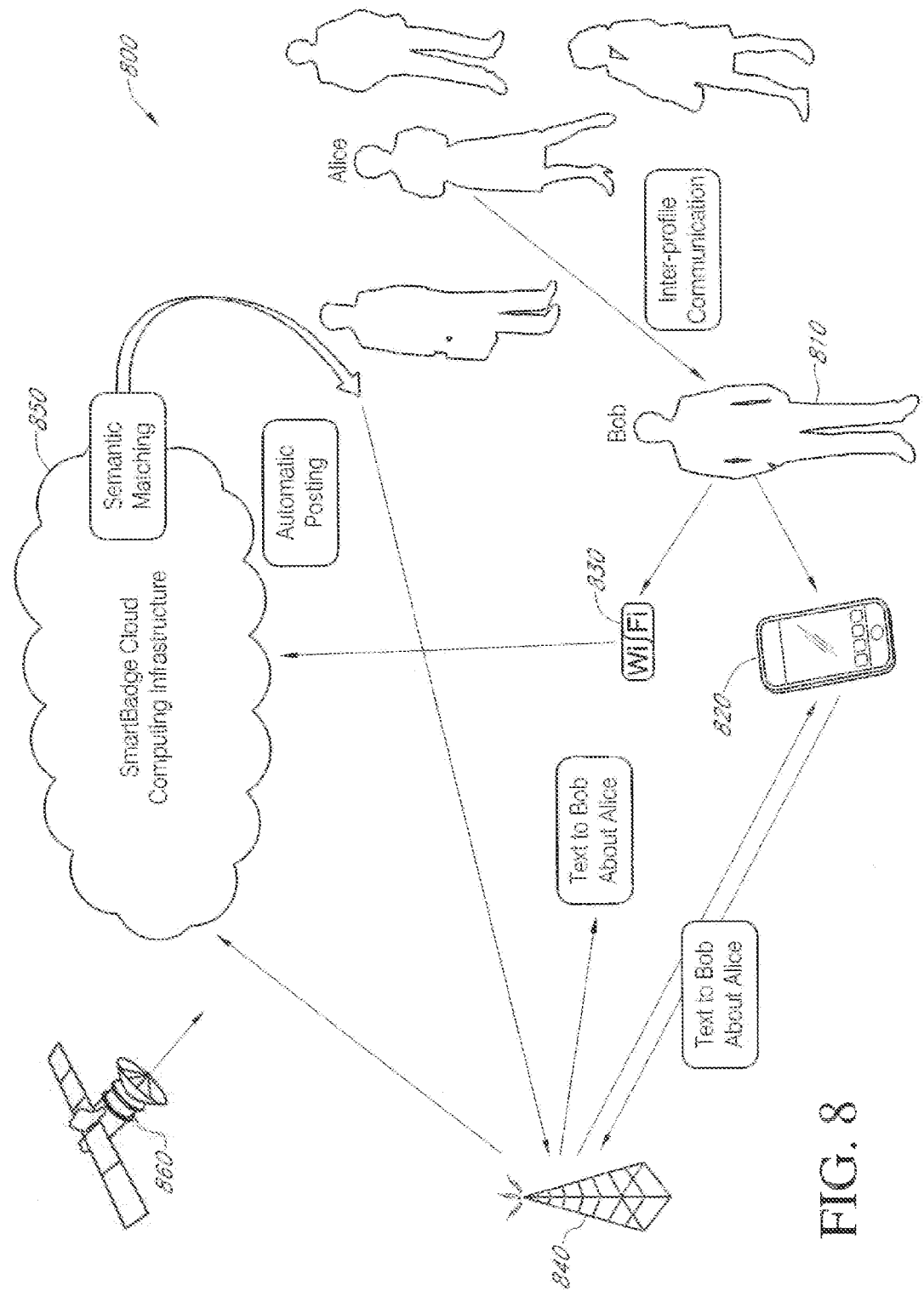
FIG. 8 is a functional block diagram of an example smart badge system in accordance with an embodiment of the disclosure.

Referring now to FIG. 8, a functional block diagram of an example smart badge system 800 is shown. It should be appreciated that the design of the smart badge 810 may be based at least in part on desired functionalities, e.g., communication methods, available bandwidth, battery life, etc. For example, in some embodiments, a low-power custom radio wireless interface may be selected to enable communications between smart badges. The radio interface between the smart badges may address a plurality of considerations, such as: (1) supporting the unlicensed 2.4 GHz band and having a short communication range, e.g., less than 100 feet; (2) supporting the security aspect considerations in preventing spurious intrusion or hacking of smart badges; and (3) providing unique identifications for each node enabling each smart badge to have a unique identification. In some embodiments, the smart badge to smart badge communication, e.g., inter-profile communications, is achieved using one or more FM radios.

In some embodiments, a wireless interface between the smart badge 810 and a user cell phone 820 may be through class 3 Bluetooth, e.g., having a range of approximately 1 meter and maximum permitted power of 1 mW (0 dBm). The cell phone user already is accustomed with the Bluetooth headset that transfers data at very low bit rates and at the same time uses considerably limited power. A custom application programming interface ("API") may enable interaction between the smart badge 810 and the cell phone 820. Hence, the data that is stored in the smart badge 810 at any given time can be greatly reduced, which, in turn reduces the internal memory storage capacity of the smart badge.

In some embodiments, the smart badge 810 may update contents whenever a Wi-Fi node 830 is accessible, thus reducing airtime cost footprint of the cell phone for smart badge updates.

In some embodiments, a mini-USB interface (not shown) may be selected for the smart badge 810 to address design considerations. For example, the smart badge 810 may interface to a host computer or laptop for the user to update his/her profile and to upload or download data through the mini-USB interface. Also, the rechargeable batteries of the smart badge may be charged using the USB interface.

As described in further detail above in the discussion of FIGS. 1-7, data storage in a smart badge is contemplated as well as the ability for the smart badge to offload its data using one or more methods. For example, in some embodiments, the smart badge 810 may communicate with a personal computer via a USB port and synchronize data directly with a dedicated application (e.g., Windows, Macintosh, or Linux application). In other embodiments, the smart badge 810 may communicate with a Wi-Fi node or network 830 to periodically synchronize accumulated data with a predetermined central server, e.g., as part of a cloud computing infrastructure 850.

In still other embodiments, the smart badge 810 may synchronize through a user's cell phone 820 using an embedded radio (e.g., Bluetooth) and dedicated mobile phone application (e.g., Symbian-based application). The mobile phone 820 thereafter may utilize the cellular network 840, such as CDMA or GSM to transmit and receive data. Additionally, in some embodiments, a GPS-location data will be obtained from a satellite 860, using the user's cell phone 820 and/or a GPS receiver integrated within smart badge 810. This third method may allow a user to send periodic, location-based update messages to social networking websites like Facebook and Twitter. Thus, an automatic update to Twitter saying "I am at a Starbucks enjoying my Vanilla-Mocha" or "I crossed my friend Ryan at the supermarket" would not only realize the dream of ubiquitous networking, but also open up the possibility of tracking friends and family (like aging parents or rowdy teenagers) if and when desired.

Media Access Control Design

In some embodiments, the smart badge system is a mechanism for information exchange between people with similar interests. For example, the setting might be densely populated (by these badges) such as in a conference or a professional organization meeting or may be sparse such as when two people exchange their business cards during a chance encounter at a shopping mall. In a conference setting, there may be several tens of users in a single room as opposed to a sparse distribution of the cards in a shopping mall.

In this section an example energy-efficient duty-cycled MAC protocol for bidirectional message exchange between smart badges is described. The smart badges in this example are mobile, short-range communicators, and low-power wireless devices. The 802.15.4 MAC is used as a starting point, with modifications and additional mechanisms tailored to the smart badges' specific application provided to improve reliability, energy efficiency and throughput. An analysis of the application requirements and system characteristics provide a plurality of design considerations.

Characteristics of the MAC

In some embodiments, the smart badge can be perceived of as a slow moving, e.g., human walking speed, low-cost, low-power mobile node exchanging message sizes not greater than one packet. There may be two types of messages, e.g., 'Profile' and 'Description', that may be shared on a single radio channel over a short range of transmission, e.g., approximately 2 meters. The traffic type may be intermittent, e.g., application/external stimulus defined, with nodes having a low duty-cycle. The application need not be QoS specific and may be moderately latency tolerant.

Preferably, the MAC Protocol for the smart badge factors in attributes, such as: energy efficiency, increasing network lifetime, rapid scalability/adaptability to changes in network size, node density/topology, etc. Latency, throughput and bandwidth utilization may also be factored in.

With these factors in mind, in some embodiments, the 802.15.4 MAC serves as the smart badge base. The nodes may use an ad-hoc network topology with Direct Transmission approach to communicate in a peer-to-peer fashion. The nodes may contend for access to the shared channel using unslotted CSMA/CA. A simple DATA-ACK (Acknowledgement) sequence may be employed without prior data transmission notification, e.g., no RTS/CTS sequence employed. Asynchronous duty-cycling may be used to improve energy efficiency and network lifetime. The nodes may broadcast a "strobed" short preamble containing the source address and basic Profile information.

Protocol Design

In some embodiments, all nodes may be assumed to be in sleeping mode. When the Sleep-Timer of a node, e.g., node 'A', expires, the node performs a Clear Channel Assessment ("CCA"). If the channel is found to be free, it may broadcast a short, e.g., strobed, preamble frame containing its source address and Basic Profile. Meanwhile, any other node in the vicinity, e.g., node 'B', may wake up and may listen to the broadcast. Since 'B' is in the hearing range of 'A', it might be the case that 'B' concludes that their profiles match and hence it wishes to exchange its profile description with 'A'. The following packet exchanges may occur between 'A' and 'B':

1. 'B' waits for a random amount of time and performs a CCA. If the channel is found to be idle; 'B' transmits its basic profile information to 'A' along with its address information.
2. Once 'A' receives 'B's profile information and address, if it decides to send its description, it waits for a short period of time and then transmits its profile description to 'B' with an ACK bit set to '1'.
3. 'B' on receiving the description from 'A', waits for yet another short period of time and transmits its description to 'A' again with the ACK bit set to '1' acknowledging receipt of 'A's profile description.
4. 'A' thereafter acknowledges receipt of 'B' s data indicating a successful data transaction.

However, if 'A' had not wanted to share its profile description with 'B', then it would indicate that to 'B' by sending a negative acknowledgement (ACK bit set to 0) without transmitting its profile description to 'B'. 'B' would then abort the connection.

On the other hand, if 'B' had not received either an acknowledgement (positive or negative) from 'A', it would assume that a collision had occurred. Under such circumstances, 'B' would use an exponential back-off protocol and retry transmitting to A. Keeping in mind the low power design constraint, the retransmissions may be limited to one or two attempts.

Design Choices

As described above, the MAC protocol may be at least partially based on the IEEE 802.15.4 standard, which is characterized by its ability to achieve extremely low manufacturing and operation costs and retain technological simplicity without sacrificing flexibility or generality. The standard was developed with the limited power supply availability in mind as well. However, in some embodiments, MAC layer modifications may be implemented to improve throughput and power consumption.

Network Topology:

Considering various features of the application such as the limited range, low transmit power and economic feasibility, a peer-to-peer ad-hoc network topology may be selected. This topology may be suitable for applications that are not latency-sensitive neither QoS specific and it enables the nodes to simply connect to each other at-will in a peer-to-peer fashion thus eliminating the overhead associated with synchronization with an access point. Further, it has been shown that dense clusters of wireless nodes in an ad-hoc configuration provides higher capacity than centralized control while circumventing the overhead caused due to coordinated channel access. Specifically, a non-beacon enabled Direct Data Transmission approach may be taken where the nodes are all Full Function Devices ("FFDs") and contend for channel access using unslotted CSMA/CA with exponential back off. This is different from 802.15.4's optional Guaranteed Time Slot ("GTS") method of data transfer where there is a contention free period ("CFP").

An RTS/CTS mechanism may be elected to be used in the protocol. This exclusion provides an advantage in terms of control overhead and transmission latency. Although the absence of RTS/CTS could lead to the hidden node problem, the performance degradation was found to be minor for low data rate applications.

Energy Efficiency:

In some embodiments, the technique of "asynchronous duty cycling" or periodically but asynchronously putting the nodes to sleep in order to conserve power may be used. Asynchronous duty cycling may allow the sender and receiver to have independent duty cycles and also avoid the overhead introduced by synchronized wake/sleep schedules. The nodes may independently decide to wake up and sleep based on an algorithm that takes into account traffic variations. In addition to this, a short strobed preamble may be used to circumvent the latency introduced by long preambles.

Accordingly, a design for a MAC layer protocol of an ad-hoc wireless application of bidirectional message exchange between low-power, short-range, mobile nodes is provided. The protocol may place a special emphasis on the primary attributes of energy efficiency, adaptability and scalability and is well suited for the smart badge application.

Physical Layer Design

In some embodiments, it is desirable for the physical layer to be able to work in the presence of significant co-channel interference. To mitigate this interference, the smart badges may transmit at a very low power level, thereby minimizing the interference caused to a nearby node. Apart from making the problem tractable, the low transmit power condition also fits in well with the paradigm of wearable communication devices. Since the information may be exchanged as two people cross each other or are proximate to each other, the devices may be in communicating range for only a short time.

In some embodiments, constraints for the physical layer may be: (a) it is assumed that the communicating devices are within communication range for about two seconds, (b) it is assumed that the range of communication is about two meters and the range of interference to be about 4 meters, (c) the capacity of the system may be limited by the multi-user interference and (d) the system data rate may be relatively low, e.g., a few kilobits per second at most.

In some embodiments, an FM radio-based technology may be used for maximizing the battery life when the smart badge is continuously scanning and transmitting. For example, short-range FM transmitters may be used to transmit the user profiles data, as discussed further below with reference to FIG. 9. An advantage of this technique is that the power consumption of an FM transmitter is one of the lowest among available radios today. In some embodiments, either a radio data system ("RDS") or an audio channel may be used for the transmission.

Characteristics of the PHY Layer

In some embodiments, a single wideband antenna may serve the physical layer of the badge-badge communication as well as the Bluetooth and Wi-Fi networks that the smart badge can sync over. In general, a goal in physical layer design is a low cost, low power and low complexity communication system.

With these factors in mind, in some embodiments, the smart badges may work on either or both of the two available unlicensed bands (900 MHz and 2.4 GHz). The smart badges may work in a frequency division duplex ("FDD") manner so that they can simultaneously transmit their information and listen to other devices entering the area. Modulation may be used, such as quadrature phase shift keying ("QPSK") to provide good power efficiency at relatively low data rates. A Gaussian channel model with no fading due to the short communication ranges and the absence of multiple obstructing objects between the people (wearing the badges) may be used. Direct sequence spread spectrum ("DS-SS") with a high spreading factor to mitigate the interference may be used.

Structure of the Data Frame

In some embodiments, the information in the smart badge holder's profile may be transmitted in one quick burst since it is not expected that the sizes of the profiles will exceed a few kilobits. The information may be encoded with a turbo code to improve the reliability of received data and minimize the transmitter power. The information transmission may be preceded by the transmission of a preamble, which aids in symbol-timing and carrier-phase synchronization. Retransmissions may be possible if the MAC layer determines that the receiver has not correctly decoded the data. In such situations, the retransmitted packet may have an identical structure.

Preamble

Generally, the synchronization preamble (different from the MAC layer preamble) is a short burst of known data spread by the wideband pseudo noise ("PN") sequence of the transmitter. The system may be designed such that there is a "mother-code" that is common to all the devices and each badge may have a specific offset (the "seed") that determines its unique PN spreading code. In order to maintain the simplicity of the circuitry, the Bluetooth Device Address ("BDAddr") of the badge itself may be used as the seed for the PN sequence generation. The length of time of the preamble ("TP") may be chosen such that the spreading sequence is repeated twice in that duration to maximize the probability of signal acquisition. The data transmission may begin after a waiting time ("TW") after the end of the preamble so that the receiver can be ready for data reception.

Coding and Modulation

In some embodiments, the data may be encoded with a rate $1/3$ turbo code. The two component codes may be rate $1/2$ recursive systematic convolution codes with two states in their trellis diagrams. The encoded data may be modulated using QPSK signals. The modulated symbols may be shaped with the pulse-shaping filter in order to minimize out-of-band transmissions. The resulting inter symbol interference ("ISI") may be eliminated at the receiver using an equalizer.

Data Spreading

In some embodiments, the transmitted data may be spread using the PN spreading code of the transmitting device. The data may be spread over the entire unlicensed band to maximize interference rejection. Interference avoidance techniques may be used in choosing the offsets of the mother code for the badges. The dispreading unit at the receiver may also perform the acquisition and tracking.

Link Budget Consideration

In some embodiments, the system may be designed such that data transmission is successful if the receiver and transmitter are within a predetermined proximity of each other, e.g., within two meters of each other. The transmitter power levels may therefore be very low. At these power levels, the interference of one device may not extend beyond a circle of radius four meters. Beyond that distance, the signal may be heavily attenuated. This allows us to have multiple interference-free groups of transmitting-receiving badges inside the same conference room.

Hardware Architecture

Example architecture of the smart badge for accommodating data communication between multiple smart badges and to a custom API resident in the user cell phone is described. In some embodiments, the smart badge apart may accommodate a microprocessor-based control unit ("MCU") to assemble and encode data for transmission and to decode and extract data from received packets in the prescribed data format supporting the data constraints and power constraints for both the PHY layer and MAC sub layer. The final smart badge may be a heterogeneously integrated system supporting multiple communications standards, enabling simultaneous multiple smart badge interactions as well as cell phone updates.

Hardware Design Considerations

In some embodiments, the smart badge may have one or more of the following design constraints:

(1) A small form factor that does not exceed in physical size and weight comparable mobile devices, e.g., PDAs, smart phones, etc.;
(2) A unique identity for identification;
(3) A wireless interface to update/synchronize the current content of the user to social networking sites through a viable medium such as a cell phone/palmtop/netbook;
(4) A wireless interface for using available Wi-Fi nodes to update/sync its current content to the social networking site;
(5) The smart badge may be enabled with a wired interface to upload/download user profile and accumulated data from a laptop/desktop;
(6) Provisions to recharge the smart badge's batteries for continuous operation;
(7) A modular platform that can accommodate any legacy or custom standards/protocols; and
(8) Multiple antennas and associated space to support them for serving multiple wireless interfaces.

The smart badge may communicate at very low bit rates and on a need to interact basis only. The PHY and MAC layers may ensure when data interactions are to take place. The smart badge may evaluate the available power based on the usage pattern and the total content of the data in memory on when to update/to interact with a cell phone. When not in use, the MCU or FPGA may be working at the power save/sleep mode. The power management of the smart badge may managed by the software module that runs in it (See FIG. 2).

Additional Applications

As an additional feature, in some embodiments, a cloud computing infrastructure may serve as an archival medium for all smart badge transactions which may be stored using a Resource Description Framework ("RDF") data model in subject-predicate object form. An API may be provided that allows social scientists an ability to mine historical smart badge transaction data using semantic web query languages such as SPARQL and RQL. Archiving smart badge transaction data in RDF may apply a machine-readable description to each transaction event, which allows social science researchers to derive new knowledge about how people form personal and professional relationships. For example, a researcher may be able to perform a query to obtain a connected graph showing the flow of human communication that originated from new relationships formed among a group of people meeting for the first time at a professional conference to the submission of a proposal to the final publishing of a research paper. Another example could involve semantic queries that result in data used in studies on trends and patterns in how new personal relationships develop from common athletic or business interests. This type of global database that stores details, in semantic form, about when, where, and how people meet and interact is not known to presently exist. Thus, the smart badge device offers an excellent physical mechanism through which such data can be gathered in an automated way, transformed into a machine readable ontology, e.g. friend of a friend ("FOAF"), and used to derive new knowledge about human relationship formation.

The present disclosure provides a new way for people to gather, assimilate and disseminate information in an automated way. Furthermore, it advocates the implementation of a revolutionary new mobile device that will transform the way people use social networking applications like Twitter, Facebook, and MySpace. In some embodiments, this device resembles a common wearable ID badge and contains several radios used to interface with public 802.11 Wi-Fi access points, Bluetooth devices, USB capable computers and PDAs. This device or badge may also have a miniature GPS tracking receiver or device that allows wearers to automatically transmit location specific tweets. When two or more smart badge wearers encounter one another in public, profiles may be exchanged automatically. Additionally, a tweet may be constructed that specifies the current state of each user. The user's state may then be transmitted to one or more social networking sites via a Wi-Fi or Bluetooth radio link. This practice of automated micro-blogging may effectively advance social networking to the next level by mechanizing the construction of new social networks.

EXAMPLE

To illustrate the value of a smart badge, in a social, professional, or activity-related context, two fictional characters, Alice and Bob will be used. Alice is a university professor who teaches computer engineering and Bob is an electrical engineer living in San Diego who works for a major telecommunications company. Both Alice and Bob are interested in wireless communications and are likely to attend the same professional conferences. Further, both are currently single, maintain active lifestyles, and enjoy practicing yoga in their free time.

On one day, after having a conference paper accepted in the area of power management schemes for wireless devices, Alice has just arrived at her local airport and is awaiting departure to San Diego to attend an IEEE conference on wireless technologies. It is early in the morning and Alice is dressed in professional attire and sporting a smart badge attached to her silver brooch with a standard clasp. With a dimension of 86×54×3 mm and an approximate weight of 10 g, the smart badge is no larger than a standard credit card and weighs less than an iPod Shuffle. Alice has found the smart badge easy to wear and comfortable to stow in her billfold wallet along with other credit cards when not in use. While Alice walks to her assigned boarding gate she passes hundreds of other passengers, each on the way to their respective destinations.

Unbeknownst to Alice, her good friend Eve from the same neighborhood passes by on an opposite escalator. Eve is wearing her smart badge clipped to her purse. Both women are tending to their luggage and departure times and fail to recognize each other on the escalator. However, as the two pass by, their two smart badges detect one other and exchange profile data.

A few seconds later when Alice steps off the escalator her Smart badge comes within range of the airport's free Wi-Fi zone. Using her mobile phone, Alice earlier configured her smart badge to be in automatic Wi-Fi synchronization mode. In this mode, any event data stored by the smart badge is uploaded whenever the badge is able to achieve Internet access through an available free Wi-Fi access point. During synchronization, an XML document characterizing the event between Alice and Eve is uploaded to a cloud infrastructure that hosts services that process incoming smart badge transaction according to a user's profile.

Alice has previously registered her Twitter and Facebook accounts with her smart badge personal profile which cause badge events to be reflected as Tweets and Facebook status updates. Since Eve is following Alice in Twitter, Eve receives a Tweet on her mobile phone that she has just had a brief encounter with Alice. Because smart badge transaction times are recorded, the text in the received Tweet distinguishes between brief and extended encounters.

Upon receiving the Tweet, Eve immediately phones Alice and the two converse on their mobile phones about the fact they are both at the airport. The two make plans to attend a neighborhood party after they return from travel. Alice speaks to Eve for quite some time and ends up boarding the plane last. Fortunately, Alice has reserved a seat in the plane's fore section and is able to board with relative ease.

During flight, however, Alice must leave her seat to use the lavatory in the aft section. As she ventures down the aisle, Alice passes Mallory, also a professor of computer engineering, but from another university in the same city. Mallory is on her way to the same IEEE conference and is also holding a smart badge in her coat pocket.

Alice and Mallory have never met, but they have each configured their professional profile to trigger an exchange of data whenever a similarity score reaches a set value. Alice's professional profile is configured to exchange data whenever her badge comes into proximity with a person who has indicated an interest in wireless communications research and a willingness to collaborate professionally.

Mallory's badge reads and stores Alice's professional profile and transmits professional attributes to Alice's badge, including a compressed list of Digital Object Identifiers ("DOIs") of recent journal and conference publications.

During flight, Alice's badge is well out of range of cellular and Wi-Fi service. But when Alice finally arrives in San Diego and is situated comfortably in her hotel, she uses the One-Touch Synchronization button on her badge to cause stored professional event data to be uploaded to her personal laptop via an embedded Bluetooth radio. Alice is both surprised and excited to learn of Mallory's existence since they are both university professors in the same city and have never meet. Alice uses smart badge Desktop, a full featured Windows application that manages professional contact information gleaned from captured badge events to learn more about Mallory's research interests.

Alice clicks on several of Mallory's uploaded DOI's and is able to browse through some of Mallory's recent publications. After combing through Mallory's vitae, Alice decides to send Mallory an email introducing herself with the hope of possibly working on a collaborative research proposal. Later that morning, Mallory responds to Alice and suggests they meet during the conference to brainstorm about common research interests.

After unpacking, Alice walks over to the conference exhibition hall for check in and registration. While standing in line, Alice catches the eye of another attendee and the two begin to exchange suggestive smiles with one another. It's Bob, the electrical engineer who works for a major telecommunications firm in the San Diego area and he is wearing his smart badge around his neck, attached to his conference provided ID lanyard. Bob is walking with his colleagues, discussing a joint paper he will be presenting during a session on new advances in delivering multimedia content using 3rd Generation CDMA2000 capable devices. As Bob passes by Alice he stops to introduce himself and two carry on a brief conversation lasting about a minute and a half. Since Bob is with his colleagues, he feels some pressure to end the conversation and does so, but walks away hoping to see Alice again where they can have an opportunity to get to know more about one another. Because Alice and Bob's casual conversation lasted over a minute, their two smart badges observed an extended encounter which triggered the exchange of personal profile data. While Bob walks away from the conversation he quickly presses his badge's One Touch button which uploads Alice's personal profile data to the mobile phone he carries on his belt. The smart badge remote mobile application running on Bob's phone collects stored smart badge data and transmits it to any number of user designated social networking sites on the Internet. Bob has configured smart badge remote to automatically generate a Facebook Add as Friend request to people he exchanges personal profiles with. Later that evening when Bob returns to his condominium, he logs into Facebook to see if Alice accepted his friend request, which Alice did! Bob is delighted to find that Alice is single and writes a message on her Facebook wall asking her to attend his talk tomorrow.

While perusing Alice's Facebook profile, Bob also notices Alice has indicated an interest in yoga. Bob then writes another message on Alice's wall about a great yoga studio he frequents in San Diego and suggests they go together before the conference is over. It turns out that while Bob was writing on Alice's wall, Alice has also been logged into Facebook and sends Bob a direct message through Facebook Chat saying she could really use a yoga session tonight after having endured such an uncomfortable plane trip earlier in the day. Bob writes back saying he knows of a late night class and offers to pick her up at her hotel. Alice agrees to go and inserts her smart badge into a neoprene arm band she uses to wear her badge during exercise. Later, when Alice and Bob arrive at the studio, she finds several others wearing smart badges. During the session, Alice's badge remains in close proximity with other badge holders and during this time exchanges activity profile data with each participant.

An activity profile exchange is triggered whenever a badge identifies another with common extracurricular interests, such as athletic interests, hobbies, or favorite things to do. Since each one of the yoga participants has indicated an interest in yoga in their activity profile, a complete pair wise exchange takes place during the yoga session where all pairs of smart badges exchange activity data.

Later that night after Bob has returned Alice to her hotel, Alice decides to write Bob an email before retiring for the night, thanking him for the nice time. However, just before shutting down her laptop for the night, Alice synchronizes her badge using the built in Bluetooth radio. During data transfer, Smart badge Desktop asynchronously queries a number of popular social networking sites to mine profile information about each of the people whose activity profiles were collected earlier during yoga class. It turns out that one of the yoga participants, Zoe, is the wife of a professor of computer science from the same university as Mallory and has accompanied her husband to San Diego for the conference. Alice recognizes Zoe through Zoe's MySpace picture which Smart badge Desktop was able to find and decides to write one last email to Zoe before going to bed, suggesting that they get together as yoga partners back in their home town. After sending Zoe an email, Alice is ready to hit the sack and plugs her Micro USB charger cable into her smart badge so it is ready for use the next day.

As noted above, there may be scenarios where cellular (e.g., 3G/4G) or Wi-Fi services may be either unattractive or even impossible to use. For example, during emergency situations (e.g., hurricanes, earthquakes and other natural disasters) cellular networks may become overwhelmed and people may find it very difficult to obtain cellular or Wi-Fi services. Another example is a scenario where one may want to exchange small amounts of data with others repeatedly and over a relatively short range, such as in the same room or building. Using either cellular or Wi-Fi services in that case might significantly reduce battery life or even incur expenses for downloading data. Disclosed herein are implementations that can use a personal range FM transmitter/receiver in such instances. Advantages of using FM transmitter(s) and FM receiver(s) include, but are not limited to: (a) the frequencies of the FM band (88-108 MHz), can easily propagate through walls of concrete and stucco; (b) no infrastructure (e.g., access point or base station) is necessary; (c) very low radio power consumption due to the inherent signal-to-noise ratio enhancement of wideband FM (e.g., receiver current may be 9.0 mA and transmitter current may be 13.0 mA); and (d) free unlicensed use over short ranges.

Embodiments disclosed herein can implement personal range FM transmitters, such as those in mp3 audio transmitters (e.g., devices that can transmit music, for example, to be played through a car stereo) for digital data transmission. Other implementations can include an application on a smart phone or personal digital assistant with FM transmission capabilities.

The FM radio has been perfected over decades for audio signal communication. To make best use of this channel, the digital data, as described herein, may generally be formatted in such a way that it resembles an audio signal—particularly in its spectral characteristics. Since the bandwidth of the message cannot exceed 15 kHz for analog FM radios, the raw data rate that can be supported by this radio is fairly low (e.g., in the 10-20 kbps range). The range of communication may be about 100 feet, for example. A bit error rate of $10^{-3}$ is achievable at this range. Lower bit error rates can be achieved with error control coding, for example. Since FM modulators and demodulators are non-linear systems, the digital signal may experience non-linear distortion that can be measured and corrected. Exemplary parameters of an example FM radio transmitter/receiver are provided below in Table 1:

TABLE 1

| Modulation | BPSK-OFDM, QPSK-OFDM |
|---|---|
| No. of OFDM subcarriers | 64 |
| Total bandwidth | 12.8 kHz |
| Subcarrier bandwidth | 200 Hz |
| Data Rate | 11.2 kbps, 22.4 kbps |
| Cyclic Prefix (samples) | 8 |
| Channel coding | convolutional |

An 8-sample cyclic prefix may be used to remove effects of inter-symbol interference (IS), for example. The 0-th FFT bin may be left vacant as commercial FM may not exhibit a good response below 200 Hz, for example, of message frequency. The OFDM frame bandwidth can be 12.8 kHz, sufficiently below the FM transmitter's 15 kHz bandwidth limiting filter, according to an exemplary embodiment. The OFDM demodulator may also implement mitigation techniques for inter-symbol and inter-carrier interference. A preamble may be used for channel estimation and symbol timing recovery, according to various embodiments. A superheterodyne frequency up-conversion technique, for example, may be used at the transmitter to first modulate the in-phase and quadrature components of the OFDM signal to an intermediate frequency (IF) before the final state of frequency modulation to the FM band. Of course, one of ordinary skill in the art would realize that single carrier baseband modulation can also be used instead of multicarrier modulation at the IF band, without departing from the scope of the present disclosure.

Figure 9:
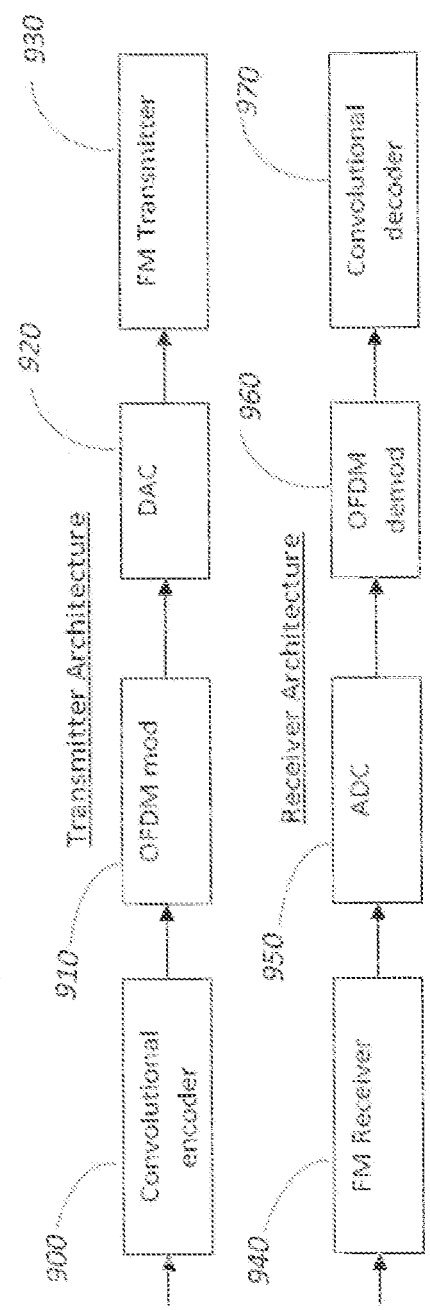
FIG. 9 is a block diagram of exemplary FM transmitter and FM receiver architectures in accordance with an embodiment of the disclosure.

Referring to FIG. 9, exemplary transmitter and receiver architectures using an FM transmitter and an FM receiver are shown. Exemplary transmitter architecture can include a convolutional encoder 900 which encodes data that is to be modulated by an OFDM modulator 910. The modulated signal can pass through a digital-to-analog converter (DAC) 920 before being transmitted by the FM transmitter 930. Referring to the receiver architecture, an FM receiver 940 can receive the signal from an FM transmitter 930, which then can be converted into a digital signal via an analog-to-digital converter (ADC) 950. The digital signal can be demodulated at an OFDM demodulator 960 and decoded at a convolutional decoder 970. Of course, the exemplary architectures are merely for exemplary purposes, and one of ordinary skill in the art would realize that other modules, or various combinations thereof, may be implemented within the scope of the disclosure.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

We claim:

1. A first electronic device for data exchange comprising:
a controller having an operations unit; and
a communication unit configured to continuously receive and/or transmit data to a second electronic device, using a frequency modulated (FM) radio single wideband antenna within a range of communication of up to approximately 100 feet;
wherein said operations unit is configured to determine if received data from said second electronic device meets a set threshold defined in part by user profile matching, the profile matching including comparing the data from the second electronic device against data on the first electronic device using key-indexed quick-matching to produce a correlation coefficient, wherein said operations unit is configured to instruct the communication unit to accept data from the second electronic device if the correlation coefficient meets or exceeds said threshold, wherein said operations unit is configured to store and implement said threshold for accepting data,
wherein the data received from the second electronic device comprises user profile data including personal information from the second electronic device and wherein said second electronic device transmits a secret key to the first electronic device for user authentication.

2. The device of claim 1, wherein a memory unit is configured to store user profile data and wherein said operations unit determines if the received data from said second electronic device meets a set threshold by comparing the received user profile data from the second device with the user profile data including personal information stored on the memory unit.

3. The device of claim 1, wherein the communication unit comprises at least two antennae.

4. The device of claim 1, wherein the communication unit is further configured to receive from and transmit data to a third electronic device using a different transmission type than the FM radio.

5. The device of claim 4, wherein the communication unit is configured to receive and transmit data from the third electronic device using Bluetooth.

6. A system for collecting personal data comprising;
a first portable electronic device configured to continuously receive, via a frequency modulated (FM) radio single wideband antenna within a range of communication of up to approximately 100 feet, user profile data and authentication keys, the user profile data including personal information from one or a plurality of electronic devices operating within close proximity of said first electronic device and exceeding a compatibility threshold on said first electronic device, wherein the user profile data is associated with a correlation coefficient determined using key-indexed quick-matching, wherein the first portable electronic device further comprises a global positioning system unit, and wherein upon receiving the user profile data from electronic devices, the first portable electronic device is configured to transmit an approximate location of the first portable electronic device to a server that is configured to post the location of the first portable electronic device on a web page.

7. The system of claim 6, wherein the first portable electronic device comprises a power supply, and wherein a computing device is configured to charge the power supply.

8. The system of claim 6, wherein a computing device is configured to receive a user profile including personal information from the user and transmit the user profile to the first portable electronic device.

9. The system 8, wherein the first portable electronic device further comprises one or more antennae configured to continuously transmit the user profile data from the first electronic device using a short-range transmission medium and transmit the user profile data from the one or plurality of electronic devices using a long-range transmission medium.

10. A method for identifying individuals having one or more pre-designated traits, the method comprising:
storing a user profile data including personal information on a first portable electronic device;
continuously transmitting the user profile data and an authentication key from the first portable electronic device via a frequency modulated (FM) radio single wideband antenna within a range of communication of up to approximately 100 feet;
receiving, via the FM radio single wideband antenna, user profile data including personal information and an authentication key from a second electronic device at the first portable electronic device;
comparing the user profile data from the first electronic device with the user profile data from the second electronic device using key-indexed quick-matching to produce a correlation coefficient;
determining if the user profile data from the second electronic device meets or exceeds a predetermined threshold defined in part by the user profile of the first electronic device; and
identifying the user profile data from the second electronic as having one or more pre-designated traits if the user profile data meets or exceeds the predetermined threshold.

11. The method of claim 10, further comprising storing the user profile data from the second device identified as having one or more pre-designated traits.

12. The method of claim 10, further comprising transmitting the user profile data from the second electronic device identified as having one or more pre-designated traits using a long-range transmission medium.

13. A non-transitory computer-readable medium having instructions stored thereon for execution by a processor to provide a method for identifying individuals having one or more pre-designated traits, the method comprising:
storing a user profile data including personal information on a first portable electronic device;
continuously transmitting, via a frequency modulated (FM) radio single wideband antenna within a range of communication of up to approximately 100 feet, the user profile data from the first portable electronic device and an authentication key;
receiving, via the FM radio single wideband antenna, user profile data including personal information from a second electronic device at the portable electronic device and an authentication key;
comparing the user profile data from the first electronic device with the user profile data from the second electronic device using key-indexed quick-matching to produce a correlation coefficient;
determining if the user profile data from the second electronic device meets or exceeds a predetermined threshold defined in part by the user profile from the first electronic device; and
identifying the user profile data from the second electronic device as having one or more pre-designated traits if the user profile data from the second electronic device meets or exceeds the predetermined threshold.

14. The method of claim 13, further comprising transmitting the user profile data from the second electronic device identified as having one or more pre-designated traits using a long-range transmission medium.

15. A first electronic device for data exchange comprising:
means for storing a user profile data including personal information for the first electronic device;
means for continuously transmitting an authentication key and the user profile data for the first electronic device using a frequency modulated (FM) radio single wideband antenna within a range of communication of up to approximately 100 feet;
means for receiving an authentication key user profile data including personal information for a second electronic device using the FM radio single wideband antenna;
means for comparing the user profile data for the first electronic device with the user profile data for the second electronic device using key-indexed quick-matching to produce a correlation coefficient;
means for determining if the user profile data for the second electronic device meets or exceeds a predetermined threshold defined in part by the user profile for the first electronic device; and
means for identifying the user profile data for the second electronic device as having one or more pre-designated traits if the user profile data for the second electronic device meets or exceeds the predetermined threshold.

16. The electronic device of claim 15, further comprising means for displaying at least a portion of the user profile for the second electronic device on a web page.

* * * * *